Oct. 29, 1946.                E. K. CLARK                2,410,014
                            HEATING APPARATUS
                           Filed May 15, 1942
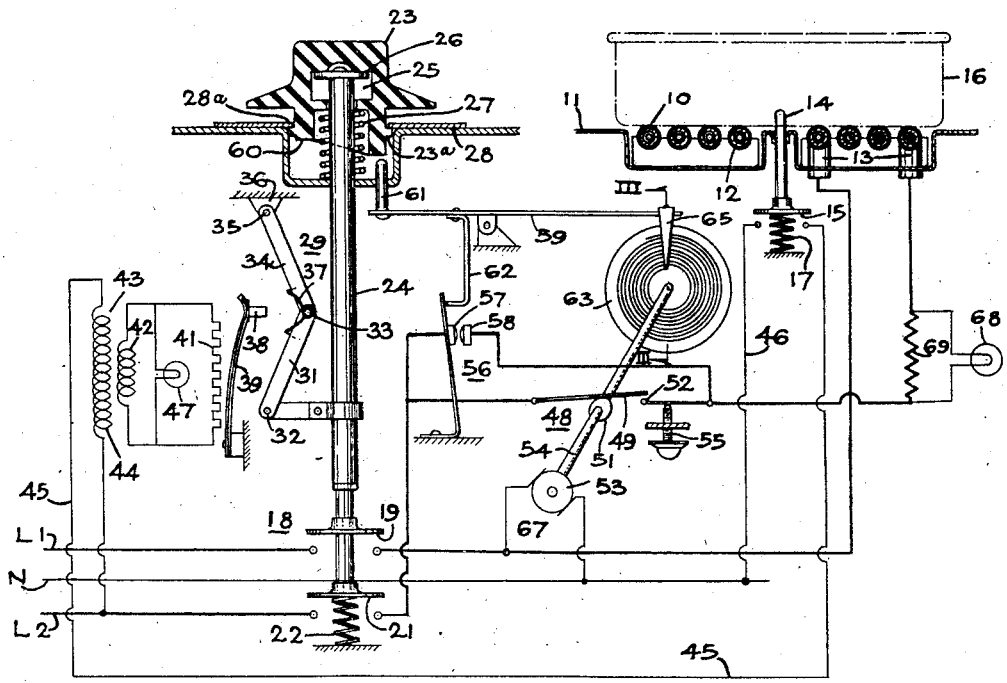
FIG. 1.
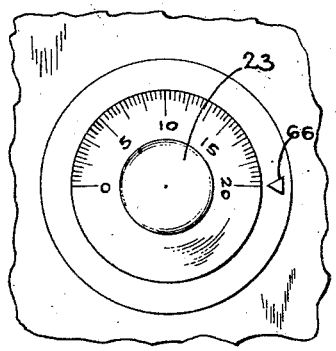    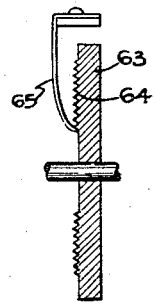
FIG. 2.         FIG. 3.
WITNESSES:                                    INVENTOR
                                           EARL K. CLARK
                                           BY
                                              ATTORNEY Patented Oct. 29, 1946

2,410,014

UNITED STATES PATENT OFFICE 2,410,014

HEATING APPARATUS

Earl K. Clark, Mansfield, Ohio, assignor to Westinghouse Electric Corporation, East Pittsburgh, Pa., a corporation of Pennsylvania Application May 15, 1942, Serial No. 443,033

7 Claims. (Cl. 219—20)

My invention relates to apparatus for controlling electric heaters employed for the heating of cooking vessels or the like and it has for an object to provide improved control apparatus of this kind.

It is a further object of my invention to provide a simplified control for an electric heater whereby the heater is energized at a high rate for initiating a cooking operation, after which the rate of energization is reduced to a pre-selected value and energization is terminated by the removal of the cooking vessel from the heater.

A further object of the invention is to provide a relatively short time delay between the removal of the vessel from the heater and the deenergization of the heater in order that the operator may be permitted to adjust or remove the vessel from the heater for short periods of time without deenergizing the heater.

The usual surface cooking operation on an electric hotplate, which provides for the cooking of food at 212° F., requires for best operating performance and economy the application of heat at a high rate to the cooking vessel until the temperature thereof approximates 212° F., and then reducing the rate of heat transmission to the vessel to a value which will sustain this temperature or one a few degrees lower. In accordance with my invention, this operation is carried into effect and may usually be initiated by the adjustment of a single control device. Furthermore, the cooking cycle is terminated merely by the removal of the cooking vessel from the heater. The latter operation deenergizes the heater after a period of time of relatively short duration has elapsed subsequent to the removal of the vessel. The purpose of providing the time interval between the removal of the vessel and the deenergization of the heater is to allow the operator to remove the vessel momentarily without deenergizing the heater. The time delay device also prevents deenergization of the heater if the pan or vessel is jarred or inadvertently removed momentarily from the heater by the operator.

These and other objects are effected by my invention as will be apparent from the following description and claims taken in connection with the accompanying drawing, forming a part of this application, in which:

Fig. 1 is a diagram of my control apparatus applied to a cooking plate;

Fig. 2 is a front view of a detail shown in Fig. 1; and,

Fig. 3 is a section taken along the line III—III through another detail of the apparatus shown in Fig. 1.

Reference will now be had to the drawing wherein I have shown my improved control applied to a surface cooking plate 10 of an electric range, the cooking platform of which is shown at 11. The cooking plate 10 may be of any well-understood construction and, as shown, includes an encased element or heater 12, the terminals of which are shown at 13. Arranged centrally of the cooking plate is a vertically-extending push rod 14 which actuates a switch 15 to its closed position when a cooking vessel 16 is placed upon the plate. The switch 15 is biased to its open position at all times by a compression spring 17 so that the switch 15 is open when the vessel 16 is removed. As described more in detail hereinafter, the closing of switch 15 conditions the control for energization of the heater 12 and the opening of the switch 15 effects deenergization of the heater 12.

The heater 12 is energized from a suitable source of power through a circuit shown by way of example as an Edison three-wire circuit, the outside conductors of which are shown at $L_1$ and $L_2$ and the neutral conductor is shown at N. The heater 12 is controlled by a line switch generally indicated at 18 and having poles 19 and 21 connected, respectively, in the line conductors $L_1$ and $L_2$. The line switch 18 is biased at all times toward its open position by a compression spring 22 and is moved manually to its closed position by a push button 23 and a stem 24.

The push button 23 is recessed as shown at 25 to receive a shoulder 26 carried by the upper end of the stem 24 and is biased outwardly to its normal position or the position shown in the drawing by means of a compression spring 27 arranged between the push button 23 and a plate 28 which, preferably, forms a part of the casing for the control mechanism. When the push button 23 is depressed by the operator, the shoulder 26 and stem 24 move with the button 23 to effect closing of the line switch 18. The line switch 18 is maintained closed by apparatus to be described hereinafter. When the operator releases the button 23, it is returned to the position shown in the drawing by the compression spring 27. Outward movement of the button 23 is limited by a shoulder 23a formed on the button and engageable with a stop 28a on the plate 28. In the closed position of the line switch 18 and with the button released, the shoulder 26 of the stem 24 is, of course, disposed at the opposite end of the recess 25. The reason for returning the push button 23 to the position shown after the operator has released the same will become apparent as the description proceeds.

The mechanism for retaining the line switch closed includes a toggle, generally indicated at 29, and including a link 31 pivoted at one end to the stem 24, as shown at 32. The opposite end of the link 31 is pivoted, as shown at 33, to a second link 34, the latter being pivoted at 35 to a fixed member 36. A torsion spring 37 engages the pivot 33 and the links 31 and 34, and provides a bias which tends to move the links 31 and 34 to the left as viewed in Fig. 1. The bias of the spring 37 is, of course, insufficient to overcome the bias of the main compression spring 22. The purpose of the spring 37 is to swing the pivot 33 to the left of the vertical centerline through the pivots 32 and 35 as the stem 24 is depressed.

Adjusting means is provided for the toggle structure 29 which prevents its retaining the line switch 18 closed during periods when the vessel-operated switch 15 is open and which allows the toggle 29 to retain the line switch 18 closed when the vessel-operated switch 15 is closed. This adjusting means includes a stop 38 carried by a heat-responsive member 39 and disposed in the path of the connected links 31 and 34 when the heat-responsive member 39 is cold. Accordingly, the stop 38 prevents the torsion spring 37 from aligning the links 31 and 34 when the stem 24 is depressed so that, when the operator releases the button 23, the compression spring 22 functions to break the toggle and open the line switch 18. When the heat-responsive member 39 is heated, the stop 38 is moved to the left, as viewed in Fig. 1, and permits some slight movement of the pivot 33 to the left of the centerline extending through the pivots 32 and 35 under the action of the torsion spring 37. In this position, the links 31 and 34 prevent upward movement of the stem 24 so that the compression spring 22 is ineffective to open the line switch 18 upon release of the button 23.

The heat-responsive member 39 is heated by a suitable electric heater 41 controlled by the vessel-operated switch 15. As shown, the heater 41 is connected across the secondary 42 of a step-down transformer 43, the primary 44 of which is controlled by the switch 15. One terminal of the primary 44 is directly connected to the line conductor L2 and the other terminal of the primary 44 is connected by a conductor 45 to one side of the switch 15. The opposite side of the switch 15 is connected by a conductor 46 to the neutral conductor N. An indicating lamp 47 is connected in parallel with the heater 41 and is illuminated at all times that the switch 15 is closed. This indicating lamp 47 is, preferably, arranged adjacent the push button 23 so that, where a number of plates 10 of an electric range are equipped with respective controls, the lamp 47 will indicate the proper button 23 to be operated.

The rate at which heat is transmitted to the vessel 16 or the rate of energization of the heater 12 may be varied in any well understood manner. I have shown, for example, a cam operated switch 48 connected in series with the heating element 12 and the line switch 18 for varying the rate of energization of the heater 12. This switch includes a movable contact 49 which is reciprocated by a cam 51 into and out of engagement with a second contact 52. The cam 51 is driven by a timing device, such as, for example, a motor 53 of the type commonly employed for driving clocks through a shaft 54 and a speed reducing mechanism (not shown). It will be understood that the cam 51 is rotated at a relatively low speed of, for example, 1 R. P. M. Opening and closing of the switch 48 alternately deenergizes and energizes the heating element 12. The relation between the periods of energization and deenergization of the element 12 may be varied by an adjusting screw 55 which changes the position of the contact 52 relative to cam-operated contact 49. Accordingly, the period of time that these contacts 52 and 49 are closed to energize the heater 12 during a revolution of the cam 51 is varied. It will be understood that the particular means which I have shown for varying the rate of energization of the heater 12 is disclosed by way of example and that other well known devices, such as series-parallel switches, may be employed for effecting this operation.

In initiating a cooking operation it is desirable to energize the heater 12 at its maximum rate and, to this end, I provide a switch 56 having movable and stationary contacts 57 and 58, which switch 56 is connected in parallel with the cam-operated switch 48. It will be apparent that closure of the switch 56 establishes a shunt circuit around the switch 48 so that the heater 12 is continuously energized. When the temperature of the food in the vessel 16 is elevated to its maximum temperature, for example 212° F., the switch 56 is opened and this temperature is then maintained by the reduced energization of the element 12 under control of the switch 48. The switch 56 is manually closed and automatically opened after a pre-selected period of time by time-controlled mechanism including a pivoted lever 59, one end of which is provided with a pin 61 extending toward the bottom of the push button 23. The lever 59 also carries a finger 62 which opens the switch 56 upon clockwise movement of the lever 59 and which closes the switch 56 as the lever 59 is moved in counter-clockwise direction. Counter-clockwise movement of the lever 59 and closing of the switch 56 are effected by movement of the button 23 as it is adjusted to close the line switch 18.

The lever 59 is moved clockwise or in switch opening direction by a mechanism including a disc 63 which is rotated at relatively low speed by the shaft 54. The disc 63 is provided with a spiral groove 64 on one face thereof, which groove occupies a substantial portion of the diameter of the disc 63. A follower 65 fixed to one end of the lever 59 extends into the groove 64 and moves radially inwardly across the disc 63 as the latter is rotated. When the follower 65 is moved to the innermost portion of the groove 64, it rides out of the groove so that its inward movement is terminated irrespective of further rotation of the disc 63. In this position, the lever 59 and finger 62 are positioned as shown in the drawing so that the switch 56 is open.

The follower 65 is moved radially outwardly across the disc 63 as the lever 59 is moved counter-clockwise by the movement of the push button 23. At this time, it will be understood that the resilience of the follower 65 permits its snapping from one convolution of the groove 64 to another. The amount of counter-clockwise movement imparted to the lever 59 and therefore the distance that the follower 65 is moved outwardly across the disc 63 determines the period of time that the switch 56 is closed. The amount of movement imparted to the lever 59 is varied by providing a cam surface 60 on the under portion of the button 23 which engages the pin 61. In the position of the button 23 shown in the drawing, the pin 61 is moved a distance equivalent to the total movement of the button 23 so that the follower 65 is rocked to its outermost point on the disc 63. This adjustment provides the maximum period of time during which the switch 56 is closed. By rotating the button 23 about the stem 24, a higher position on the cam, as viewed in Fig. 1, is aligned with the pin 61. Accordingly, when the button 23 is depressed, there is some lost motion of the button 23 before it engages the pin 61. Therefore, the downward movement of the pin 61 and the outward movement of the follower 65 are reduced. Accordingly, the period of time that the switch 56 is closed is also reduced. The push button 23 may be graduated in minutes, as shown in Fig. 2, to assist the operator in adjusting the duration of the preheating period. The graduations on the knob 23 cooperate with a stationary index 66.

*Operation*

The operation of the control apparatus will now be described. The various elements of the control are shown in their inactive or "off" position in Fig. 1. It will be assumed that the push button 23 is positioned to provide the proper duration of preheating and that the adjustment 55 is positioned to provide the proper amount of heating for continuing the cooking operation. The vessel 16 with the food to be cooked is placed upon the cooking plate 10 whereby the switch 15 is closed. The latter operation energizes the primary 44 of the transformer 43 through a circuit including the line conductor $L_2$, primary 44, conductor 45, switch 15, and the neutral conductor N. Accordingly, the heater 41 is energized by the secondary 42 of the transformer and the heat imparted to the element 39 moves the stop 38 out of the path of the toggle 29. The operator then depresses the button 23 so that the line switch 18 is closed and is retained in this position by the toggle 29. Closing of the line switch initiates operation of the timer motor 53 and conditions the control heater 12 for energization of the heater 12 under control of the switches 48 and 56.

Depressing of the button 23 also moves the pin 61 downwardly so that the follower 65 is adjusted outwardly across the disc 63. As described heretofore, the downward movement of the pin 61 moves the finger 62 in such manner that the switch 56 is closed. When the button 23 is released, it is returned to the position shown by the spring 37. This return movement of the button 23 is provided to permit upward movement of the pin 61 as the latter is slowly actuated by the timer motor 53.

The heater 12 is now energized continuously through a circuit including line conductor $L_2$, pole 21 of the line switch 18, the closed contacts 57 and 58, the heating element 12, pole 19 of the line switch 18, and the line conductor $L_1$. It may be desirable at this time to indicate to the operator that the element 12 is energized. This may be accomplished by a light 68 connected across a resistance 69, the latter being in series with the heating element 12. At this time, the motor 53 revolves the disc 63 so that the follower 65 is moved inwardly as described. After a predetermined period of time determined by the adjustment of the push button 23 and the amount of outward movement imparted to the follower 65, the switch 56 is opened. From then on until the cooking operation is terminated, the heater 12 is intermittently energized by the opening and closing of the motor-operated switch 48.

The cooking operation is terminated merely by the removal of the pan 16 from the cooking plate 10. The latter operation opens the switch 15 so that the transformer 43 and heater 41 are deenergized. The bi-metal element 39 then cools and after a predetermined period of time of about 10 seconds, the element 39 moves the stop 38 into engagement with the toggle 29 and breaks the latter. As the toggle is broken, the compression spring 22 moves the line switch 18 to its open position. At this time, the shoulder 26 moves from the bottom of the recess 25 in the button 23 to the top thereof as the stem 24 moves upwardly. Opening of the line switch 18, of course, deenergizes the timer motor 53 also. The apparatus is now in the position shown in Fig. 1 and conditioned for another cooking operation.

If, during the cooping operation, the vessel 16 is inadvertently jarred from the cooking plate 10 or is removed by the operator momentarily, the line switch 17 will remain closed because of the time interval provided by the cooling of the bimetal 39. I consider this an important feature of the control over a system wherein the line switch is opened instantaneously with the opening of the vessel-operated switch 15.

From the foregoing description, it will be apparent that I have provided an improved control for a surface cooking element which is extremely simple to operate. The cooking operation, as described, is usually initiated merely by the placing of the vessel on the cooking plate and then depressing the control push button, and the cooking operation is terminated by the removal of the vessel from the cooking plate. In this connection, I have found that the majority of cooking operations usually performed on the surface plate of a range may be satisfactorily carried out with a fixed period of preheating and a fixed amount of sustaining heat. Accordingly, the adjustment 55 which determines the rate of heating and the push button 23 which determines the period of preheating, once set, need not be further adjusted when a cooking operation is started. However, where unusual conditions are encountered, such as, for example, the preparation of quantities of food larger than usually prepared, the control is readily adjustable to meet such conditions.

Reference is made to my copending application Serial No. 443,032, filed May 15, 1942, and assigned to the assignee of the present application, which copending application contains claims to the arrangement wherein energization of the heater is controlled by the positioning of the vessel on the heater.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In control means for an electrical circuit including an electric heater arranged for the heating of a cooking vessel or the like, and adjustable means connected in the circuit for varying the rate of energization of the heater, the combination of a line switch arranged in the circuit and movable manually from an open position to a closed position, switching means arranged in the circuit for energizing said heater at its maximum rate irrespective of the adjustment of said adjustable means, a time-controlled device adjustable to various stations for determining the period of time that said switching means is effective to energize the heater, and a common actuator for the line switch and for adjusting said time-controlled device.

2. In control means for an electrical circuit including an electric heater arranged for the heating of a cooking vessel or the like, and switching means arranged in said circuit and adjustable for varying the rate of energization of the heater, the combination of a line switch in said circuit and manually movable from an open position to a closed position, an additional switch arranged in the circuit and movable from an open position to a closed position wherein the heater is energized at its maximum rate irrespective of the position to which said switching means is adjusted, a time mechanism including a disc rotatable at substantially constant speed and having a spiral groove formed about the axis of the disc, a member slidably engaged with said groove and movable radially of the disc as the latter is rotated, mechanism connecting said member and said additional switch for moving the latter to its open position when the member is moved to a predetermined radial position on the disc, a stem for actuating said line switch, a handle carried by said stem and moved in a direction axially of the stem as the line switch is actuated, said handle having a cam surface thereon and said handle being rotatable about the axis of the stem and a rod connected to said mechanism and engageable with said cam surface as the handle is moved to actuate the line switch.

3. In apparatus for controlling the operation of an electrical circuit including an electric heater and adjustable means connected in said circuit for energizing the heater at various rates, the combination of switching means connected in said circuit and movable to a closed position for energizing the heater at its maximum rate irrespective of the adjustable means, a timing device for moving the switching means to its open position wherein control of the heater is returned to said adjustable means, and a common handle manually movable for closing the switching means and for adjusting the timing device for various periods of operation, said handle being adjustable to different positions for varying the period of time that the timing device is active, and said timing device being ineffective at any time to change the position to which the handle is adjusted, the movement of said handle for closing the switching means being in a different direction or mode than the movement for adjusting the timing device, so that the handle may be moved for closing the switching means without changing the adjustment.

4. In control apparatus for an electrical circuit including an electric heater and adjustable means connected in said circuit for energizing the heater at various rates, the combination of first means connected in said circuit for energizing the heater at its maximum rate irrespective of the adjustable means, timing means for rendering the first means inactive after a period of operation of selected duration and a handle for initiating operation of the first means and the timing means, said handle being manually adjustable to various positions for selecting the period of time that the first means is active and said timing means being ineffective at all times to vary the position to which the handle is manually adjusted, the movement of said handle for initiating operation of the first means and the timing means being in a direction or mode different from the movement thereof for manually adjusting the same, whereby the handle may be actuated to initiate operation of the first means and the timing means without changing the adjustment thereof.

5. In apparatus for controlling the energization of an electrical circuit including an electric heater, and adjustable means connected in said circuit for varying the rate of energization of the heater, the combination of a line switch connected in said circuit, a time-controlled switch connected in the circuit and movable to a closed position for energizing the heater at its maximum rate irrespective of the adjustment of said adjustable means, said time-controlled switch being movable to its open position after a period of time has elapsed subsequent to the closing thereof, and a push button movable axially for actuating the line switch and for closing the time-controlled switch, said push button being movable about its axis for adjusting the period of time that the time-controlled switch is retained in its closed position.

6. In apparatus for controlling the energization of an electrical circuit including an electric heater, and adjustable means connected in said circuit for varying the rate of energization of the heater, the combination of a time-controlled switch connected in the circuit and movable to a closed position for energizing the heater at its maximum rate irrespective of the adjustment of said adjustable means, said time-controlled switch being movable to its open position after a period of time has elapsed subsequent to the closing thereof, and a handle movable along an axis thereof for closing the time-controlled switch, said handle being movable angularly about said axis for adjusting the period of time that the time-controlled switch is retained in its closed position.

7. In a time-controlled switch mechanism, the combination of a switch, a movable member, said member effecting opening of said switch in one position thereof and effecting closing of said switch upon movement away from said one position, timing means responsive to movement of said member away from said one position for measuring a period of time dependent upon the extent of movement of said member away from said one position and for returning the member to said one position at the end of the period of time, an angularly-adjustable and axially-movable cam member which is adapted, upon axial movement, to move said first-mentioned member away from said one position a distance dependent upon the angular adjustment of the cam member, whereby said cam member may remain angularly adjusted for a desired period of time and is adapted to initiate a timing operation of the length determined by its angular adjustment, during which time said switch is closed.

EARL K. CLARK.